United States Patent
Iriyama et al.

(10) Patent No.: US 9,325,010 B2
(45) Date of Patent: *Apr. 26, 2016

(54) NEGATIVE ELECTRODE ACTIVE MATERIAL FOR LITHIUM SECONDARY CELL, LITHIUM SECONDARY CELL EMPLOYING THE SAME, AND METHOD FOR PRODUCING THE SAME

(75) Inventors: Jiro Iriyama, Tokyo (JP); Tetsuya Kajita, Tokyo (JP); Daisuke Kawasaki, Tokyo (JP); Tatsuji Numata, Tokyo (JP); Kazuhiko Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 151 days.

This patent is subject to a terminal disclaimer.

(21) Appl. No.: 14/112,141

(22) PCT Filed: Apr. 27, 2012

(86) PCT No.: PCT/JP2012/061401
§ 371 (c)(1),
(2), (4) Date: Oct. 16, 2013

(87) PCT Pub. No.: WO2012/147930
PCT Pub. Date: Nov. 1, 2012

(65) Prior Publication Data
US 2014/0045063 A1    Feb. 13, 2014

(30) Foreign Application Priority Data
Apr. 28, 2011 (JP) .................................. 2011-101508

(51) Int. Cl.
H01M 4/136 (2010.01)
H01M 4/60 (2006.01)
H01M 4/62 (2006.01)
H01M 4/04 (2006.01)
H01M 4/38 (2006.01)
H01M 4/587 (2010.01)

(52) U.S. Cl.
CPC ............ *H01M 4/606* (2013.01); *H01M 4/0404* (2013.01); *H01M 4/622* (2013.01); *H01M 4/386* (2013.01); *H01M 4/387* (2013.01); *H01M 4/587* (2013.01)

(58) Field of Classification Search
None
See application file for complete search history.

(56) References Cited

FOREIGN PATENT DOCUMENTS

CN    101136499 A    3/2008
CN    101340002 A    1/2009

(Continued)

OTHER PUBLICATIONS

Behniafar, et. al., Novel modified aromatic polyamides and polyimides derived from a diphenyl ether-based diamine containing laterally-attached phenoxy phenylene groups, Advanced Materials Research (2010), 93-94, pp. 255-258.*

(Continued)

*Primary Examiner* — Cynthia K Walls
(74) *Attorney, Agent, or Firm* — Finnegan, Henderson, Farabow, Garrett & Dunner LLP

(57) ABSTRACT

Provided is a negative electrode active material for a lithium secondary cell, the material having the function of a binder for the active material, and being capable of stable reversible reactions with lithium. Also, provided are an extended-life lithium secondary cell having improved energy density and stable charge/discharge, and a method for producing the same. The negative electrode active material for a lithium secondary cell is polyimide represented by formula (1) (wherein R1 and R2 independently denote an alkyl, alkoxy, acyl, phenyl, or phenoxy group).

10 Claims, 1 Drawing Sheet

(56) References Cited

FOREIGN PATENT DOCUMENTS

| EP | 0 552 731 A1 | 7/1993 |
|---|---|---|
| JP | 2997741 | 1/2000 |
| JP | 2001-345103 | 12/2001 |
| JP | 3311402 | 8/2002 |
| JP | 2004-247233 | 9/2004 |
| JP | 2005-285563 | 10/2005 |
| JP | 2005-317309 | 11/2005 |
| JP | 2011-076900 | 4/2011 |
| JP | 2011-076901 | 4/2011 |
| JP | 2011-124175 | 6/2011 |
| WO | WO 2012/073853 | 6/2012 |

OTHER PUBLICATIONS

International Search Report mailed Jul. 3, 2012.
Office Action issued by the Chinese Patent Office in counterpart Chinese Patent Application No. 201280020840.3 dated Apr. 27, 2015.

* cited by examiner

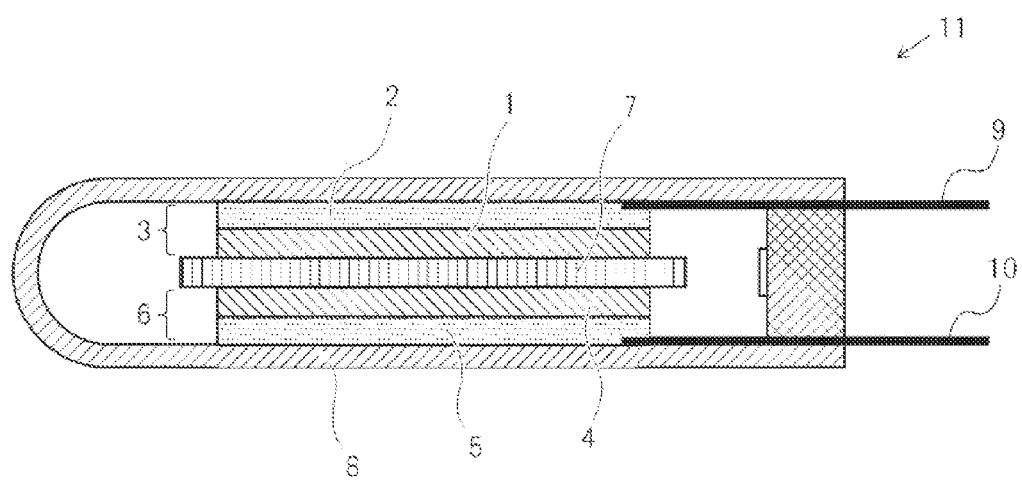

NEGATIVE ELECTRODE ACTIVE MATERIAL FOR LITHIUM SECONDARY CELL, LITHIUM SECONDARY CELL EMPLOYING THE SAME, AND METHOD FOR PRODUCING THE SAME

CROSS-REFERENCE TO RELATED PATENT APPLICATIONS

This application is a National Stage Entry of International Application No. PCT/JP2012/061401, filed Apr. 27, 2012, which claims priority from Japanese Patent Application No. 2011-101508, filed Apr. 28, 2011. The entire contents of the above-referenced applications are expressly incorporated herein by reference.

TECHNICAL FIELD

The present invention relates to a negative electrode active material for a lithium secondary cell, the material having the function of a binder for the active material, and being capable of performing stably reversible reactions with lithium ions. Also, the present invention relates to an extended-life lithium secondary cell of improved energy density, reduced deterioration in repetitive charge/discharge and superior cycle properties produced by using such a negative electrode active material, and a method for producing the same.

BACKGROUND

It has been extensively used a lithium secondary cell which uses an organic solvent, absorbs and releases reversibly lithium ions on positive and negative electrodes and allows repetitive charge/discharge for applications such as potable electronic devices or personal computers, and even in a battery for driving a motor in hybrid electric vehicles. There exists a need for advanced miniaturization and weight lightening in such a lithium secondary cell, as well as there exist major challenges such as increased amounts of lithium ions absorbed and released in positive and negative electrodes, improved energy density and reduced cycle deterioration in charge/discharge.

This type of lithium secondary cell has a structure configured by opposite-disposing a negative electrode active material layer having a negative electrode active material formed on a current collector and a positive electrode active material layer having a positive electrode active material formed on a current collector with a separator intervened therebetween within an outer body wherein the negative electrode active material and the positive electrode active material are capable of absorbing and releasing reversibly lithium ions in charge/discharge, filling an electrolytic solution to immerse them, and sealing the outer body. The active material of the negative electrode active material layer or the positive electrode active material layer is bound intimately by a binder, and these layers are formed adhered to the respective current collector.

As such a lithium secondary cell, it has been reported one having a negative electrode formed by intimately binding a carbon powder negative electrode active material with a polyimide binder (Patent Documents 1 and 2), one having a negative electrode formed by intimately binding a silicon or silicon alloy negative electrode active material with a polyimide binder (Patent Documents 3 and 4) as well as one having a negative electrode formed by intimately binding a silicon oxide negative electrode active material with polyimide (Patent Document 5).

However, as a binder for active materials, polyimide having the following structural formula is used.

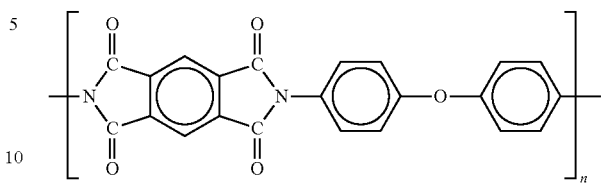

Such polyimide undergoes the ring-opening of imide rings during repetitive charge/discharge and hence exhibits reduced chemical resistance, resulting in shortened cell life. Accordingly, there exists a need for a binder of which the deterioration of chemical resistance involved in charge/discharge may be suppressed.

PRIOR ART DOCUMENTS

Patent Documents

Patent Document 1: JP Patent No. 3311402 Gazette
Patent Document 2: JP Patent Application Publication No. 2004-247233
Patent Document 3: JP Patent Application Publication No. 2005-285563
Patent Document 4: JP Patent Application Publication No. 2005-317309
Patent Document 5: JP Patent No. 2997741 Gazette

SUMMARY OF THE INVENTION

It is an objective of the present invention to provide a negative electrode active material for a lithium secondary cell, the material having suppressed deterioration of chemical resistance in charge/discharge caused by polyimide used as a binder for the active material, superior cycle properties, extended-life and improved energy density, a lithium secondary cell produced by using the same, and a method for producing the same.

The inventors have studied about polyimide used as a binder for active materials, and have found that when polyimide is obtained using diamine substituted with specific substituents as a raw material, the polyimide exhibits reduced ring-opening of imide rings during repetitive charge/discharge and suppresses the deterioration of chemical resistance involved in charge/discharge so as to serve as the binder for a prolonged period, as well as the polyimide has the function of a negative electrode active material because it reacts reversibly with lithium ions during charge/discharge. The inventors have completed the present invention based on these findings.

In one aspect, the present invention provides a negative electrode active material for a lithium secondary cell, which is polyimide as represented by formula (1):

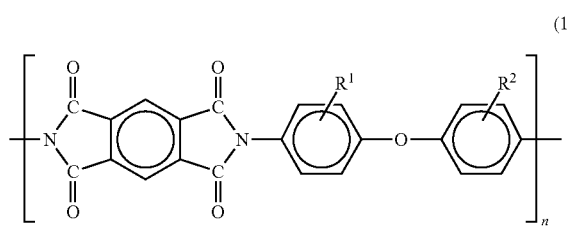

(1)

(wherein each of R1 and R2 represents an alkyl, alkoxy, acyl, phenyl or phenoxy group.)

In another aspect, the present invention provides a lithium secondary cell having positive and negative electrodes each of which comprises a respective active material layer formed on a respective current collector wherein the negative electrode active material layer comprises the negative electrode active material for a lithium secondary cell indicated above.

In further aspect, the present invention provides a method for producing the negative electrode active material for a lithium secondary cell indicated above, the method comprising heating a material for a negative electrode active material comprising polyamide acid as represented by formula (5) to form a negative electrode active material as represented by formula (1):

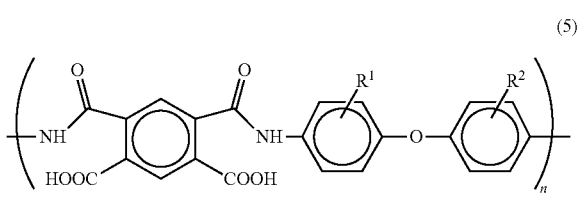

(5)

(wherein each of R1 and R2 represents an alkyl, alkoxy, acyl, phenyl or phenoxy group.)

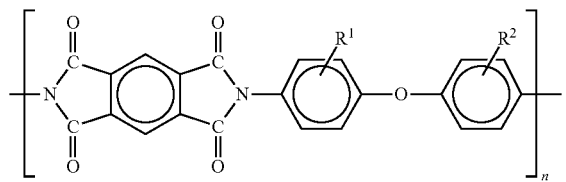

(1)

(wherein each of R1 and R2 is the same as R1 and R2 in the formula (5).)

In further aspect, the present invention provides a method for producing a lithium secondary cell, the method comprising providing a coating liquid of a negative electrode active material comprising polyamide acid as represented by the formula (5) (wherein each of R1 and R2 represents an alkyl, alkoxy, acyl, phenyl or phenoxy group), coating the coating liquid on a current collector to form a coating film thereon, and heating the coating film to form a negative electrode active material layer comprising polyimide as represented by the formula (1).

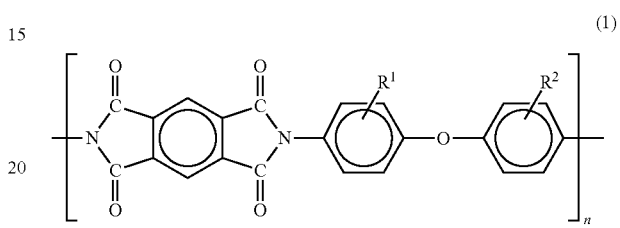

(5)

(wherein each of R1 and R2 represents an alkyl, alkoxy, acyl, phenyl or phenoxy group.)

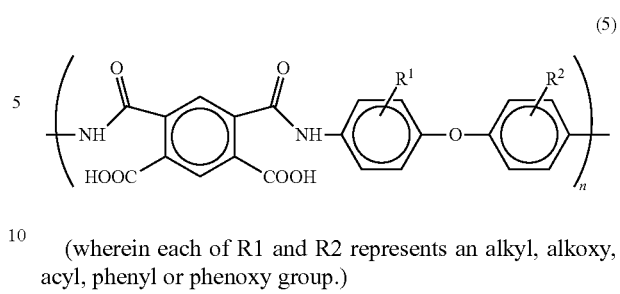

(1)

(wherein each of R1 and R2 is the same as R1 and R2 in the formula (5).)

The negative electrode active material for a lithium secondary cell according to the present invention has the function of binding intimately active materials and adhering to a current collector, as well as it can serve as the active material itself because it reacts reversibly with lithium ions during charge/discharge, leading to improved energy density of a cell. In addition, the ring-opening of imide rings involved in charge/discharge can be suppressed, so that these functions are maintained for a prolonged period and cell life is extended. Accordingly, by using the same, a secondary cell having high energy density, superior charge/discharge cycle properties and extended-life can be produced.

Furthermore, by using the method for producing the negative electrode active material for a lithium secondary cell or the method for producing a lithium secondary cell according to the present invention, a negative electrode active material for a lithium secondary cell or a lithium secondary cell can be effectively produced in industrial scale.

BRIEF DESCRIPTION OF THE DRAWINGS

FIGURE shows a schematic diagram illustrating a structure of an example of a lithium secondary cell according to the present invention.

1 negative electrode active material layer
2 negative electrode current collector
3 negative electrode
4 positive electrode active material layer
5 positive electrode current collector
6 positive electrode
7 separator
8 laminate film outer body
11 stacked laminated type secondary cell

DETAILED DESCRIPTION OF THE INVENTION

[Active Material for a Lithium Secondary Cell]

According to the present invention, a negative electrode active material for a lithium secondary cell is polyimide as represented by formula (1):

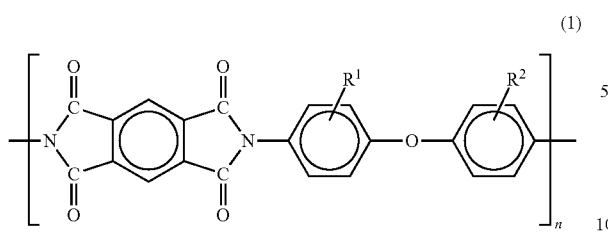

(1)

In polyimide as represented by the formula (1) (hereinafter, also referred to as polyimide (1)), phenylether group has substituents R1 and R2, so that the electron-donating ability of amido group is enhanced and the ring-opening of imide rings is suppressed even when polyimide (1) reacts with lithium ions. Accordingly, reversible reactions between polyimide (1) and lithium ions are allowed during charge/discharge, and the functions of an active material as well as a binder may be maintained.

In the formula (1), each of R1 and R2 represents an alkyl, alkoxy, acyl, phenyl or phenoxy group. Alkyl groups are preferably those having 1~6 carbon atoms, and methyl, ethyl or propyl group is particularly preferred. Among others, methyl group is preferred. Alkoxy groups are preferably those having 1~6 carbon atoms, and methoxy, ethoxy or propoxy group is particularly preferred. Among others, methoxy group is preferred. Acyl groups include acetyl, propionyl group or the like. R1 and R2 may be binded at any position in phenylene groups of the phenylether group, and it is preferred to bind at 1,5'-position.

In the formula (1), n is preferably about 50~130. An average molecular weight of polyimide (1) is preferably 20,000~50,000. When polyimide (1) has an average molecular weight in the indicated range, the polyimide (1) has viscosity suitable for binding other active materials and adhering an active material layer to a current collector.

Preferably, polyimide (1) includes polyimide as represented by formula (3) or (4).

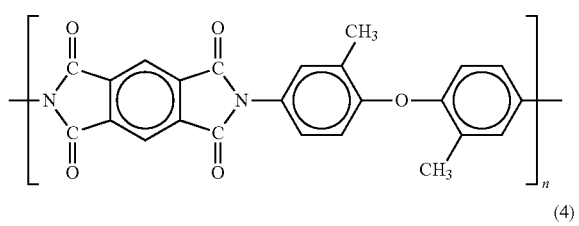

(3)

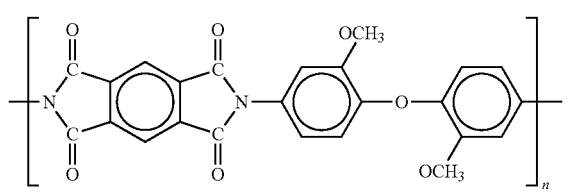

(4)

Polyimide (1) is formed as lithium polyimide coupled with lithium ions in charge/discharge, which is represented by formula (2) (hereinafter, also referred to as polyimide lithium salt (2)).

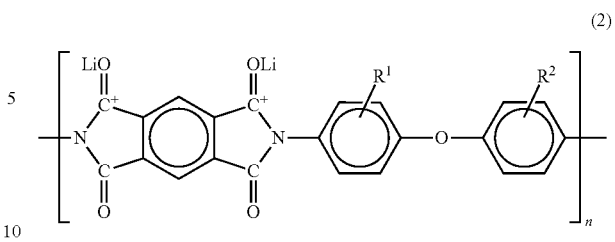

(2)

In the formula (2), each of R1 and R2 is the same as R1 and R2 in the formula (1).

These polyimide (1) and polyimide lithium salt (2) do not cause the ring-opening of imide rings during charge/discharge and perform reversible reactions with lithium ions. In addition, such polyimide has low solubility in organic solvents and low reactivity with an electrolytic solution, so that the functions of an active material for reversible reactions with lithium ions and of a binder for binding other active materials are maintained during repetitive charge/discharge.

The negative electrode active material for a lithium secondary cell as indicated above may be produced by heating a material for a negative electrode active material comprising polyamide acid as represented by formula (5) (hereinafter, also referred to as polyamide acid (5)) to form polyimide (1).

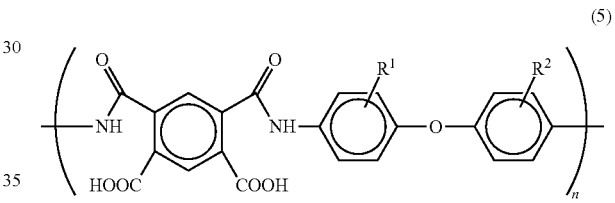

(5)

In the formula (5), each of R1 and R2 is the same as R1 and R2 in the formula (1). Heating of polyamide acid (5) causes dehydration and cyclization to form polyimide as represented by the formula (1). Preferably, the heating of polyamide acid (5) is performed at a temperature of 200° C. or higher.

As shown in the scheme of formula (6), polyamide acid (5) may be obtained by reacting tetracarboxylic acid dehydrate with 4,4'-diaminodiphenylether having substituents R1 and R2 at equivalent molar ratio.

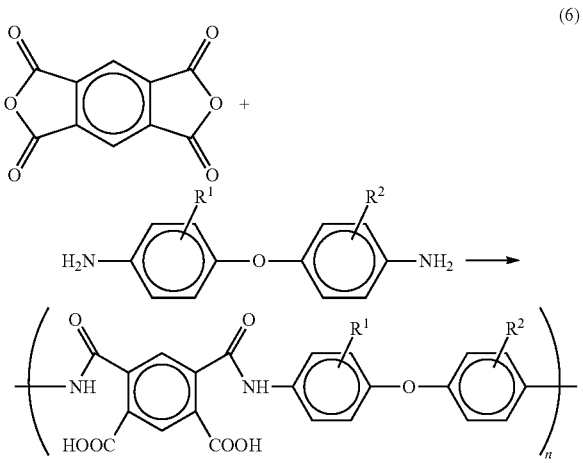

(6)

[Lithium Secondary Cell]

The lithium secondary cell according to the present invention is a lithium secondary cell having positive and negative electrodes each of which comprises a respective active material layer on a respective current collector wherein the negative electrode active material layer comprises the negative electrode active material for a lithium secondary cell indicated above.

[Negative Electrode]

The negative electrode is one having a negative electrode active material layer on a negative current collector. The negative electrode active material layer comprises the negative electrode active material as indicated above, and preferably further comprises other negative electrode active materials. Examples of other negative electrode active materials may include substances capable of absorbing and releasing lithium ions during charge/discharge such as silicon-based substances, carbonaceous substances, metals, metal oxides, or the like. Examples of silicon-based substances may include silicon or silicon oxides such as SiO or $SiO_2$. Examples of carbonaceous substances may include graphite, hard carbon or the like. Examples of metals may include metals such as Sn, Al, Si, Pb, S, Zn, Cd, Sb, In, Bi or Ag, alloys of two or more species thereof, or alloys of these metals or alloys and lithium. Examples of metal oxides may include aluminum oxide, indium oxide, zinc oxide, lithium oxide, lithium iron oxide, tungsten oxide, molybdenum oxide, copper oxide, tin oxide such as SnO or $SnO_2$, niobium oxide, $Li_xTi_{2-x}O_4$ ($1 \leq x \leq 4/3$), lead oxide such as $PbO_2$ or $Pb_2O_5$, or the like. The negative electrode active material layer may also comprise other substances such as metal sulfides such as SnS or FeS2, polyacene or polythiophene, or lithium nitride compounds such as $Li_5(Li_3N)$, $Li_7MnN_4$, $Li_3FeN_2$, $Li_{2.5}Co_{0.5}N$ or $Li_3CoN$. They may be used alone or in a combination of two or more species.

Among others, silicon-based substances, carbonaceous substances or tin-based substances such as tin or tin oxide are preferred because they have large capability of absorbing and releasing lithium ions, and it is preferred to contain one or two or more species selected from these compounds. These substances are bound by polyimide (1) to form a negative electrode active material layer.

A content of polyimide (1) in the negative electrode active material layer is preferably within the range of 5 wt % to 20 wt %, and a content of negative electrode active materials other than polyimide (1) is preferably within the range of 80 wt % to 95 wt %. If the content of polyimide (1) is at least 5 wt %, adhesion between active materials and between active materials and a current collector may be improved. If the content of polyimide (1) is not more than 20 wt %, the energy density of a negative electrode may be increased.

Also, the negative electrode active material layer may contain an electro-conductive additive to increase electron conductivity. As such an electro-conductive additive, carbon black or acetylene black may be used. A content of the electro-conductive additive may be 1~10 parts by weight with respect to 100 parts by weight of the negative electrode active material.

Also, the negative electrode active material layer may contain polyimide other than polyimide (1), polyamide, acrylic resins, methacrylic resins, fluorinated compounds, for example poly-vinylidene fluoride, rubbers or resins, for example styrene-butadiene copolymer as a binder for the negative electrode that binds intimately negative electrode active materials of powder form as long as it does not inhibit the function of the polyimide (1) or the negative electrode active materials. A content of the negative electrode binder other than polyimide (1) in the negative electrode active material layer may properly be selected depending on a binder being used. It is preferred to use 3~10 wt % range for fluorinated compounds such as polyvinylidene fluoride and 1~5 wt % range for rubber or resin such as styrene-butadiene copolymer.

Any current collector may be used as the negative electrode current collector as long as it has conductivity enough to allow a conductive connection with an external terminal and supports the negative electrode active material layer. As a material for the negative electrode current collector, copper, aluminum, titanium, nickel, silver or an alloy thereof may be used. A shape of the negative electrode current collector may be any of foil, flat or mesh shape. A thickness of the negative electrode current collector may be, for example 4~10 μm, and it is preferred to have a thickness of 5~30 μm to increase energy density.

The negative electrode may be prepared by providing a coating liquid of a negative electrode active material obtained by mixing and kneading polyamide acid (5) and, as necessary, other negative electrode active materials, a binder and an electro-conductive additive in a solvent such as N-methyle-2-pyrrolidone (NMP), coating the coating liquid onto a negative electrode current collector such as copper foil by a doctor blade or a die coater to form a coating film, and heating the coating film at 200° C. or higher to form a negative electrode active material layer. By heating the coating film, the polyamide acid (5) is dehydrated and cyclized, so that the negative electrode active material layer comprising polyimide (1) having imide rings may be formed.

[Positive Electrode]

The positive electrode is one having a positive electrode active material layer on a positive current collector. Examples of positive electrode active materials used in the positive electrode active material layer may include substances capable of absorbing and releasing lithium ions during charge/discharge such as layered-type lithium manganate, for example $LiMnO_2$ or $Li_xMn_2O_4$ ($0<x<2$), spinel-type lithium manganate, $LiCoO_2$, $LiNiO_2$, those in which some of transition metals present in the foregoing compounds are substituted with other metals, olivine compounds, for example $LiFePO_4$ or $LiMnPO_4$, $Li_2MSiO_4$ (M is at least one of Mn, Fe and Co), or the like. These substances may be used alone or in a combination of two or more species.

As with the negative electrode active material layer, the positive electrode active material layer may contain an electro-conductive additive to increase electron conductivity. As such an electro-conductive additive, the same substances as used in the negative electrode active material layer may be specifically used. A content of the electro-conductive additive in the positive electrode active material layer may be 3~5 parts by weight with respect to 100 parts by weight of the positive electrode active material.

Also, the positive electrode active material layer contains preferably a binder for the positive electrode that binds intimately positive electrode active materials of powder form and promotes adhesion with a current collector. Examples of binders may include polyimide, polyvinylidene fluoride (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyamideimide, or the like. A content of the positive electrode binder in the positive electrode active material layer may be 2~10 parts by weight with respect to 100 parts by weight of the positive electrode active material.

Any current collector may be used as the positive electrode current collector as long as it has conductivity enough to allow a conductive connection with an external terminal and supports the positive electrode active material layer. For the positive electrode current collector, the same material, shape and thickness as the negative electrode current collector may be used.

The positive electrode may be prepared by providing a material for a positive electrode active material obtained by mixing and kneading a positive electrode active material, a binder, an electro-conductivity additive and a solvent, coating, and rolling or pressing directly without a solvent. Also, after coating, a coating film may be dried to form a positive electrode active material layer. Furthermore, as another method for producing the positive electrode, there is a method of forming a positive electrode active material layer on a current collector by CVD or sputtering. Moreover, the positive electrode current collector may be prepared by previously forming a positive electrode active material layer, and then forming a thin film of aluminum, copper or titanium thereon.

[Electrolytic Solution]

The electrolytic solution is prepared by dissolving electrolytes in organic solvents and allows solubilization of lithium ions. The positive and negative electrode active material layers are immersed in the electrolytic solution, so that these layers can perform reversible reactions with lithium ions during charge/discharge Preferably, the solvents used in the electrolytic solution is stable to oxidation and reduction potentials of lithium in repetitive charge/discharge and has liquidity enough to immerse the positive and negative electrodes, so that cell life may be prolonged. Examples of solvents used in the electrolytic solution may include cyclic carbonates such as propylene carbonate (PC), ethylene carbonate (EC), butylene carbonate (BC) and vinylene carbonate (VC); chain carbonates such as dimethylcarbonate (DMC), diethylcarbonate (DEC), ethylmethylcarbonate (EMC) and dipropylcarbonate (DPC); aliphatic carboxylic acid esters such as methyl formate, methyl acetate or ethyl propionate; γ-lactones such as γ-butyrolactone; chain ethers such as 1,2-ethoxyethane (DEE) or ethoxymethoxyethane (EME); cyclic ethers such as tetrahydrofuran or 2-methyltetrahydrofuran; aprotic organic solvents such as dimethylsulfoxide, 1,3-dioxolane, formamide, acetoamide, dimethylformamide, dioxolane, acetonitrile, propyl nitrile, nitromethane, ethylmonoglyme, phosphate triester, trimethoxymethane, dioxolane derivatives, sulforane, methylsulforane, 1,3-dimethyl-2-imidazolidinone, 3-methyl-2-oxazolidinone, propylene carbonate derivatives, tetrahydrofuran derivatives, ethylether, 1,3-propanesultone, anisole, N-methylpyrrolidone; or others. These solvents may be used alone or as a combination of two or more species.

As electrolytes that are contained in the electrolytic solution, lithium salts are preferably used. Examples of lithium salts may include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_3$, $LiN(CF_3SO_2)_2$, $LiN(C_2F_5SO_2)_2$, $LiB_{10}Cl_{10}$, lower aliphatic lithium carboxylate, chloroborane lithium, lithium tetraphenylborate, LiBr, LiI, LiSCN, LiCl, imides, boron fluorides, or the like. These electrolytes may be used alone or as a combination of two or more species.

Alternatively, a gel electrolyte impregnated into a polymer such as polyacrylonitrile or poly-acrylate, a solid electrolyte such as LiPON or Li2-LiPxOy (x=1 or 2, y=2~4), an ionic liquid such as quaternary ammonium salt-imide salt, or the like may be used instead of the electrolytic solution.

A concentration of the electrolyte in the electrolytic solution is preferably within the range of 0.01 to 3 mol/L, and more preferably the range of 0.5 to 1.5 mol/L. If the concentration of the electrolyte is within the ranges indicated above, cells having improved stability, increased reliability, and lowered environmental effect may be obtained.

[Separator]

Any separator may be used as long as it suppresses a contact between the positive electrode and the negative electrode, allows penetration of charge carriers, and has durability in the electrolytic solution. Specific materials suitable for the separator may include polyolefin, for example polypropylene or polyethylene based microporous membranes, celluloses, polyethylene terephthalate, polyimide, polyfluorovinylidene, or the like. They may be used as a form such as porous film, fabric or nonwoven fabric.

[Cell Outer Body]

Preferably, the outer body should have strength to stably hold the positive electrode, the negative electrode, the separator and the electrolytic solution, is electrochemically stable to these components, and has water-tightness. As specific examples, stainless steel, nickel-plated iron, aluminum, titanium, or alloys thereof or those plating, metal laminate resins or the like may be used. As resins suitable for the metal laminate resins, polyethylene, polyethylene terephthalate, polypropylene or the like may be used. They may be used as a structure of a single layer or two or more layers.

[Fabrication Method]

To fabricate the lithium secondary cell according to the present invention, firstly, the negative electrode may be produced by providing a coating liquid for an active material comprising polyamide acid (5) and, as necessary, other active materials, an electro-conductive additive and a binder, coating the coating liquid onto a current collector to form a coating film, and heating the coating film to form an active material layer comprising polyimide (1). Then, the lithium secondary cell may be fabricated by disposing the negative electrode produced as indicated above and a positive electrode having an active material layer formed on a current collector with a separator intervened within an outer body, filling an electrolytic solution to immerse them, and sealing the outer body.

[Charge/Discharge]

In the lithium secondary cell as indicated above, charge/discharge is preferably performed in the range of 2.7V to 4.2V. If discharge terminal voltage is at least 2.7V, the deterioration of discharge capacity in repetitive charge/discharge may be suppressed, and a circuit may easily be designed. If discharge terminal voltage is not more than 4.2V, decreasing absolute value of discharge capacity may be prevented, and the discharge capacity of the negative electrode active material may be effectively used.

[Lithium Secondary Cell]

A form of the lithium secondary cell as indicated above may have any of cylindrical, flat winding rectangular, stacked rectangular, coin, winding laminate, flat winding laminate or stacked laminate forms.

As an example of the lithium secondary cell as indicated above, a stacked laminate secondary cell is shown in FIG. 1. This stacked laminate secondary cell 11 has a structure that a negative electrode 3 of a laminated negative current collector 2 and negative electrode active material layer 1 and a positive electrode 6 of a laminated positive current collector 5 and positive electrode active material layer 4 are disposed opposite each other with an intervened separator 7 that prevents a contact, and they are accommodated within a laminate film outer body 8. An electrolytic solution is filled in the inside of the laminate film. A negative lead tab 9 connected to the negative current collector 2 and a positive lead tab 9 connected to the positive current collector 5 are drawn outwardly from the laminate film 8 and used as electrode terminals.

EXAMPLES

Hereinafter, the lithium secondary cell according to the present invention will be described in detail.

Example 1

A negative electrode active material was prepared by weighing silicon monoxide having the average particle size D50 of 25 μm (made by Pure Chemical Research Center), carbon black (3030B: made by Mitsubishi Chemical Corporation) and polyamide acid as represented by formula (7) at the weight ratio of 83:2:15, and mixing said solid materials and NMP at weight ratio of 57:43 using a homogenizer to form slurry.

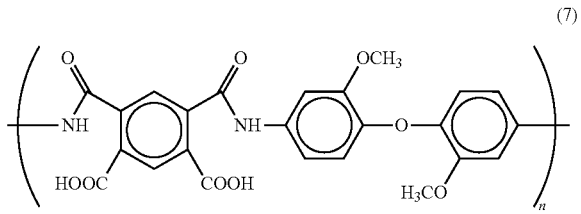

(7)

The slurry was coated onto $Cu_{0.2}Sn$ foil of 15 μm thickness using a doctor blade, and heated at 120° C. for 7 min to remove NMP. Then, heating was performed at 250° C. for 30 min in an electric furnace under nitrogen atmosphere to produce a negative electrode. A nickel negative terminal for drawing electric charge was welded to the negative electrode.

A positive electrode active material was prepared by weighing lithium cobaltate (made by Nichia Corporation), carbon black (3030B: made by Mitsubishi Chemical Corporation) and polyvinylidene fluoride (made by Kureha Chemical Co. Ltd.) at the weight ratio of 95:2:3, and mixing said solid materials and NMP at weight ratio of 52:48 using a homogenizer to form slurry. The slurry was coated onto aluminum foil of 15 μm thickness using a doctor blade, and heated at 120° C. for 5 min to remove NMP, so that a positive electrode was produced. An aluminum positive terminal for drawing electric charge was welded to the positive electrode.

An electrode device was made by overlaying these electrodes on each other with a separator intervened. The resulting electrode device was packaged in a laminate film and an electrolytic solution was filled. Then, the laminate film was sealed by heat fusion under reduced pressure to produce a flat plate lithium secondary cell. A polypropylene film was used as the separator. An aluminum-deposited polypropylene film was used as the laminate film. As the electrolytic solution, a mix solution of ethylene carbonate and diethylene carbonate at the volume ratio of 7:3 with 1.0 mol/L $LiPF_6$ was used.

The resulting flat plate lithium secondary cell was subjected to charge/discharge in the range from 4.2V to 2.7V using a charge/discharge tester (ACD-100M: made by ASKA Electronics Co. Ltd.). Charge was performed in a CCCV mode at 1 C constant current to 4.2V, and at a constant voltage for 1 h after voltage reaches 4.2V. Discharge was performed in a CC mode at 1 C constant current, and a primary discharge capacity was measured. As used herein, 1 C means a constant current value which is constantly released from a fully charged cell to finish discharge with 1 hour. In this way, 200 cycles of charge/discharge were performed, and discharge capacity was measured at $200^{th}$ cycle. A ratio of $200^{th}$ cycle discharge capacity to the primary discharge capacity (200 dc/1 dc) was calculated. The result is shown in Table 1.

Example 2

A flat plate lithium secondary cell was produced by the same method as in Example 1 except for using polyamide acid as represented by formula 8, instead of polyamide acid as represented by the formula 7 used in the negative electrode active material.

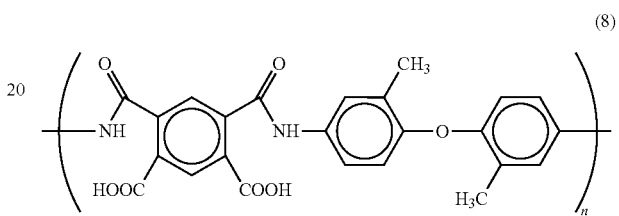

(8)

Using the same method as in Example 1, charge/discharge was performed and 200 dc/1 dc was calculated. The result is shown in Table 1.

Comparative Example 1

A flat plate lithium secondary cell was produced by the same method as in Example 1 except for using polyamide acid as represented by formula 9, instead of polyamide acid as represented by the formula 7 used in the negative electrode active material.

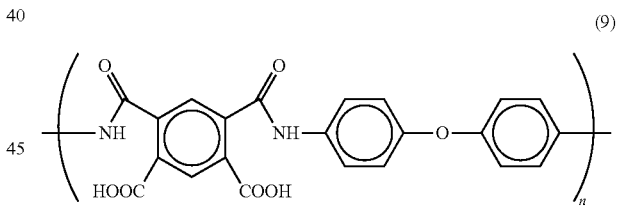

(9)

Using the same method as in Example 1, charge/discharge was performed and 200 dc/1 dc was calculated. The result is shown in Table 1.

TABLE 1

|  | 200 dc/1 dc(%) |
| --- | --- |
| Example 1 | 88% |
| Example 2 | 86% |
| Comparative Example 1 | 42% |

As seen from said results, when 200 cycles of charge/discharge was performed, the discharge capacity obtained in Comparative Example was a half of the discharge capacities obtained in Examples. Thus, it was demonstrated that the lithium secondary cell according to the present invention has reduced deterioration in repetitive charge/discharge, superior cycle properties and extended-life.

This application incorporates the full disclosure of JP Patent Application No. 2011-101508 filed Apr. 28, 2011 herein by reference.

The present invention is applicable to all of industrial fields that require power supply and industrial fields that relate to transmission, storage and supply of electrical energy. Specifically, the present invention is applicable to power supply for mobile devices such as mobile phone, notebook computer or the like.

The invention claimed is:

1. A negative electrode active material for a lithium secondary cell, which is polyimide as represented by formula 1

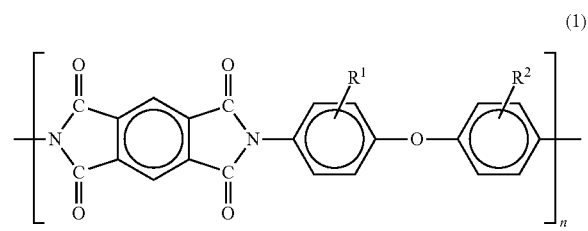

(1)

wherein, each of R1 and R2 represents an alkyl or alkoxy group.

2. The negative electrode active material for a lithium secondary cell of claim 1, wherein the polyimide as represented by formula (1) forms lithium polyimide as represented by formula (2) by reversible reactions with lithium ions during charge/discharge

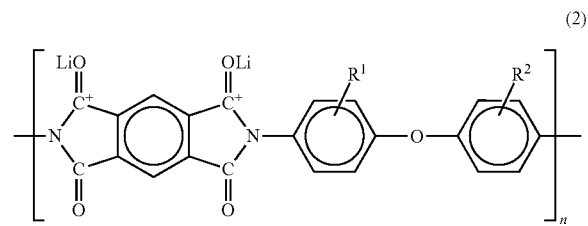

(2)

wherein, each of R1 and R2 is the same as R1 and R2 in the formula (1).

3. The negative electrode active material for a lithium secondary cell of claim 1, wherein the alkyl group is methyl group, and the alkoxy group is methoxy group.

4. The negative electrode active material for a lithium secondary cell of claim 3, wherein the polyimide as represented by formula (1) is represented by formula (3) or (4)

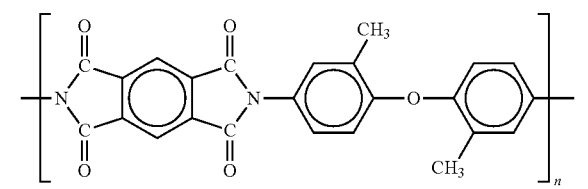

(3)

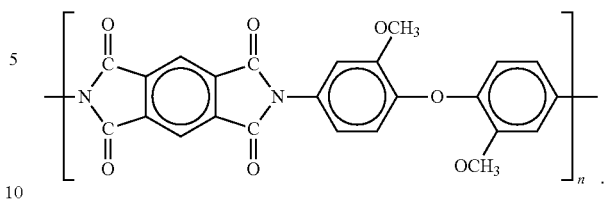

(4)

5. A lithium secondary cell having a positive electrode of an active material layer formed on a current collector and a negative electrode of an active material layer formed on a current collector, wherein the negative electrode active material layer comprises the negative electrode active material for a lithium secondary cell according to claim 1.

6. The lithium secondary cell of claim 5, wherein the negative electrode active material layer contains the negative electrode active material for a lithium secondary cell in the range of 5 wt % to 20 wt % before starting charge.

7. The lithium secondary cell of claim 5, wherein the negative electrode active material layer contains one or two or more negative electrode active materials selected from silicon-based materials, carbonaceous materials and tin-based materials.

8. A method for producing the negative electrode active material for a lithium secondary cell according to claim 1, wherein the method comprises heating a negative electrode active material comprising polyamide acid as represented by formula (5) to form a negative electrode active material as represented by formula (1)

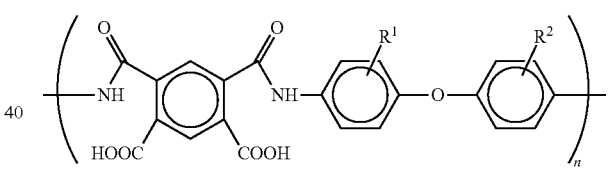

(5)

wherein, each of R1 and R2 represents an alkyl or alkoxy group,

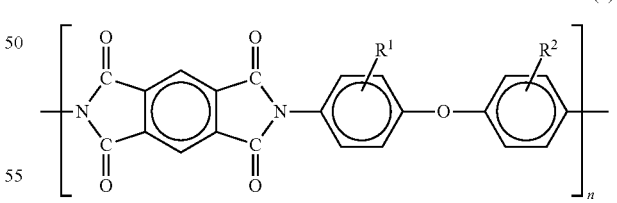

(1)

wherein, each of R1 and R2 is the same as R1 and R2 in the formula (5).

9. A method for producing the lithium secondary cell according to claim 5, wherein the method comprises providing a coating liquid of a negative electrode active material comprising polyamide acid as represented by the formula (5), coating the coating liquid on a current collector to form a coating film thereon, and heating the coating film to form a negative electrode active material layer comprising polyimide as represented by the formula (1)

(5)
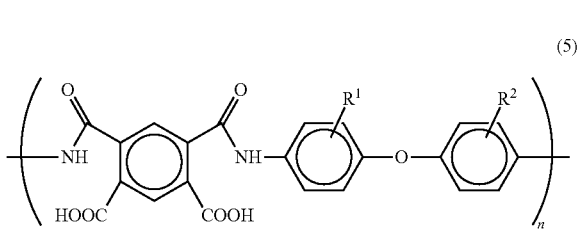
wherein, each of R1 and R2 represents an alkyl, alkoxy, acyl, phenyl or phenoxy group,
(1)
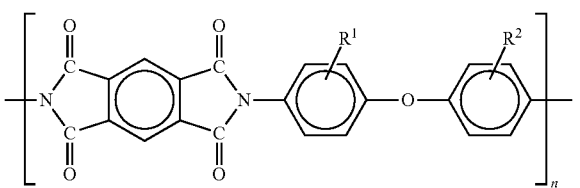
wherein, each of R1 and R2 is the same as R1 and R2 in the formula (5).
10. A negative electrode active material for a lithium secondary cell, which is polyimide as represented by formula 1
(1)
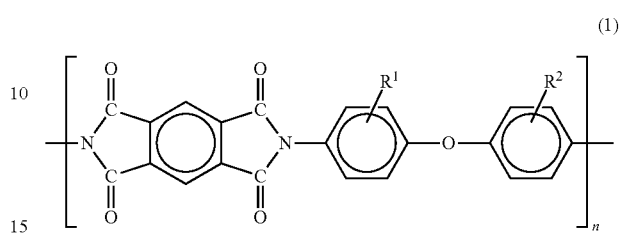
wherein, each of R1 and R2 represents methyl group or methoxy group.
* * * * *